(12) United States Patent
Fischer et al.

(10) Patent No.: US 7,911,154 B2
(45) Date of Patent: Mar. 22, 2011

(54) ELECTRONIC BALLAST WITH PHASE DIMMER DETECTION

(75) Inventors: Klaus Fischer, Friedberg (DE); Josef Kreittmayr, Bobingen (DE)

(73) Assignee: Osram Gesellschaft mit Beschraenkter Haftung, Munich (DE)

( * ) Notice: Subject to any disclaimer, the term of this patent is extended or adjusted under 35 U.S.C. 154(b) by 468 days.

(21) Appl. No.: 11/918,946

(22) PCT Filed: Mar. 22, 2006

(86) PCT No.: PCT/DE2006/000506
§ 371 (c)(1),
(2), (4) Date: Oct. 22, 2007

(87) PCT Pub. No.: WO2006/111120
PCT Pub. Date: Oct. 26, 2006

(65) Prior Publication Data
US 2009/0206765 A1    Aug. 20, 2009

(30) Foreign Application Priority Data
Apr. 22, 2005   (DE) .................. 10 2005 018 793

(51) Int. Cl.
*H05B 37/02*   (2006.01)
(52) U.S. Cl. ............... 315/291; 315/209 R; 315/DIG. 4

(58) Field of Classification Search ............ 315/209 R, 315/224–226, 246, 247, 291, 299, DIG. 4, 315/DIG. 7
See application file for complete search history.

(56) References Cited

U.S. PATENT DOCUMENTS

| 5,528,111 | A  | * | 6/1996 | Konopka et al. ............... 315/291 |
| 6,545,431 | B2 | * | 4/2003 | Hui et al. ...................... 315/291 |
| 7,129,648 | B2 | * | 10/2006 | Fischer et al. ................ 315/224 |
| 7,132,802 | B2 | * | 11/2006 | Fischer et al. ................ 315/224 |
| 2002/0033679 | A1 | | 3/2002 | Hui et al. |

FOREIGN PATENT DOCUMENTS

| DE | EP-679048 A2 * | 10/1995 |
| EP | 0 450 728 | 1/1991 |
| EP | 0 769 855 | 4/1997 |
| EP | 1 456 330 | 10/2004 |

* cited by examiner

*Primary Examiner* — Thuy Vinh Tran

(57) ABSTRACT

The invention relates to an electronic ballast comprising a converter which is used to operate a discharge lamp, for example, a low pressure discharge lamp, for selectively operating, in a direct manner, the supply network or a phase section dimmer. Jumps in the supply voltage are decoupled by a differential which is connected between at least one of the network lines and the reference potential of the ballast and transmitted to a control of the ballast, such that the control of the converter can distinguish between the operation on the phase section dimmer and on the network supply.

7 Claims, 1 Drawing Sheet

ELECTRONIC BALLAST WITH PHASE DIMMER DETECTION

TECHNICAL FIELD

The present invention relates to an electronic ballast with a converter for operating a discharge lamp, for example a low-pressure discharge lamp, for selectively operating directly on the supply system or using a phase gating dimmer.

PRIOR ART

Electronic ballasts for operating discharge lamps are known in a wide variety of embodiments. In general, they contain a rectifier circuit for rectifying an AC voltage supply and charging the capacitor, which is often referred to as an intermediate circuit capacitor. The DC voltage present at this capacitor is used for supplying an inverter, which operates the discharge lamp. In principle, an inverter produces a supply voltage for the discharge lamp to be operated with a high-frequency current from a rectified AC voltage supply or a DC voltage supply. Similar apparatuses are also known for other lamp types, for example in the form of electronic transformers for halogen lamps.

"Converters" are understood below to mean devices which are suitable for converting an input voltage into an output voltage with a different profile over time. In particular, these may be step-down converters, inverse converters or step-up converters.

Step-up converter circuits for system current harmonic reduction are known per se. Step-up converters have a storage inductor, a switching element, a diode and an intermediate circuit capacitor. The intermediate circuit capacitor supplies a discharge lamp via an inverter circuit.

Such a step-up converter functions as follows: The AC system voltage is converted in a rectifier into a pulsating DC voltage. The storage inductor and the diode are connected between a supply potential of this pulsating DC voltage and the intermediate circuit capacitor. In the switched-on state, the switching element ensures an increasing current flow in the storage inductor up to a value which can be set, the switch-off current threshold. Once the switching element has switched off, the diode conducts the current impressed in the storage inductor into the intermediate circuit capacitor.

The use of a step-up converter in a ballast for a discharge lamp is described in EP 1 465 330 A2.

Phase gating dimmers for power control are likewise known. Phase gating dimmers provide a periodic system supply to the load. In each half period, the system supply is only supplied to the load after a time which can be set, however.

DESCRIPTION OF THE INVENTION

The invention is based on the technical problem of specifying an electronic ballast which is improved in terms of its possibility of use with and without phase gating dimmers. This invention relates to an electronic ballast with a converter for selectively operating a discharge lamp directly on a system supply or using a phase gating dimmer, which ballast is designed in such a way that jumps in the supply voltage are output by at least one differentiator, which is connected between a system line and the reference potential of the ballast, and are passed on to a controller of the ballast, so that the controller can distinguish between operation using the phase gating dimmer and on the system supply.

Preferred configurations of the invention are specified in the dependent claims and will be explained in more detail below. The disclosure in this case always relates both to the method category and the apparatus category of the invention.

The invention is based on the knowledge that it is often desirable to operate converters, including step-up converters, selectively directly on the system supply or using a phase gating dimmer. In this case, the converter may need to match its operation to a supply with or without a phase gating dimmer. This may be the case, for example, if the operation of the converter in one of the two cases does not conform to standards in terms of system current harmonics or the converter in one of the two cases does not function effectively without its operation being changed over. It must then be possible for the electronic ballast to detect whether it is being operated directly on the system supply or using a phase gating dimmer; it is then possible for corresponding operational parameters to be set.

Operation using a phase gating dimmer changes the supply voltage present at the electronic ballast in a characteristic fashion. This is utilized by the invention. Phase gating dimmers only supply the system supply after a time which can be set within each system half-cycle to the ballast. During phase gating, no input voltage is present at the ballast. After this time, approximately the original supply voltage is present. The voltage at the input of the electronic ballast has a steep edge after the phase gating; jumps in the supply voltage occur.

The invention has a differentiator, which is connected between a system line and the reference potential of the ballast. This differentiator outputs the voltage jumps in the supply voltage. At its output, peak voltages which are relatively high in value occur in the case of a voltage jump. These peak voltages, after possible further processing, for example in the form of peak value detection, can be supplied to a control circuit of the converter, which can then correspondingly set the operational parameters of the converter.

The converter is preferably a step-up converter. Particular problems result when step-up converters are operated selectively using a phase gating dimmer or directly on the system supply. If, for example, the step-up converter is designed exclusively for operation using a phase gating dimmer, such as in EP 1 465 330 A2, in this case the following problem may occur in the case of the lack of a phase gating dimmer: From the time within a system half-cycle of the supply system at which the intermediate circuit capacitor has been charged sufficiently, in general the current supply to the discharge lamp is interrupted during the remaining time of this half-cycle. Since there is no phase gating during direct operation on the supply system, it is possible for no further current to be drawn relatively early on within a system half-cycle of the step-up converter. The power factor as a quotient of the active power and the apparent power is low. Furthermore, a current consumption beyond a phase angle of 90° needs to be ensured, inter alia, in accordance with the standard IEC 61000-3-2. Preferably, the electronic ballast detects by means of the differentiator whether a phase gating dimmer is connected upstream. If the ballast is functioning directly on the system supply, the operational parameters of the step-up converter are set such that it can function so as to conform to standards. This can take place by means of a reduction in the switch-off current threshold of the step-up converter. The step-up converter then draws a current having a lower amplitude. In order to charge the intermediate circuit capacitor to its maximum value, current is now drawn by the step-up converter for a longer period of time within a system half-cycle. The switch-off current threshold can be set, so as to meet the standard, in such a way that the current consumption of the step-up converter extends beyond the phase angle of 90°.

The longer the time interval of the current consumption within a system half-cycle is, the greater the power factor of the ballast also is. The operational parameters—in particular the switch-off current threshold—of the step-up converter are preferably set in such a way that the current is drawn at least over half the duration of a system half-cycle in the absence of a phase gating dimmer.

In a preferred embodiment of the invention, the operational parameters of the step-up converter are set in such a way that the amplitude of the current drawn is proportional to the system voltage present at that time. With this selection, particularly few system harmonics are produced. This setting is expedient both during operation with a phase gating dimmer and without one. During the phase gating, naturally no current is drawn by the step-up converter.

In a particularly simple and therefore preferred embodiment of the invention, the differentiator has a series circuit comprising a capacitor and a resistor. This series circuit can be connected to one of the system lines in series with the reference potential of the electronic ballast. A further capacitor can be connected to the other system line by the node between the resistor and the capacitor. Given suitable dimensioning of the capacitance and the resistance, a voltage which is proportional to the differentiated supply voltage is present at the resistor. One advantage of this simple implementation is the low number of component parts required.

Preferably, a peak value detection circuit is connected in parallel with the resistor from the differentiating circuit described in the preceding paragraph. If the step-up converter is operated using a phase gating dimmer, the controller of the step-up converter can be driven by the peak value detected via the resistor, for example by means of a switching element connected to the peak value detection.

BRIEF DESCRIPTION OF THE DRAWINGS

The invention will be explained in more detail below with reference to an exemplary embodiment. The individual features disclosed therein may also be essential to the invention in other combinations. The description above and below relates to the apparatus category and the method category of the invention, without this being explicitly mentioned.

PREFERRED EMBODIMENT OF THE INVENTION

Figure 1:
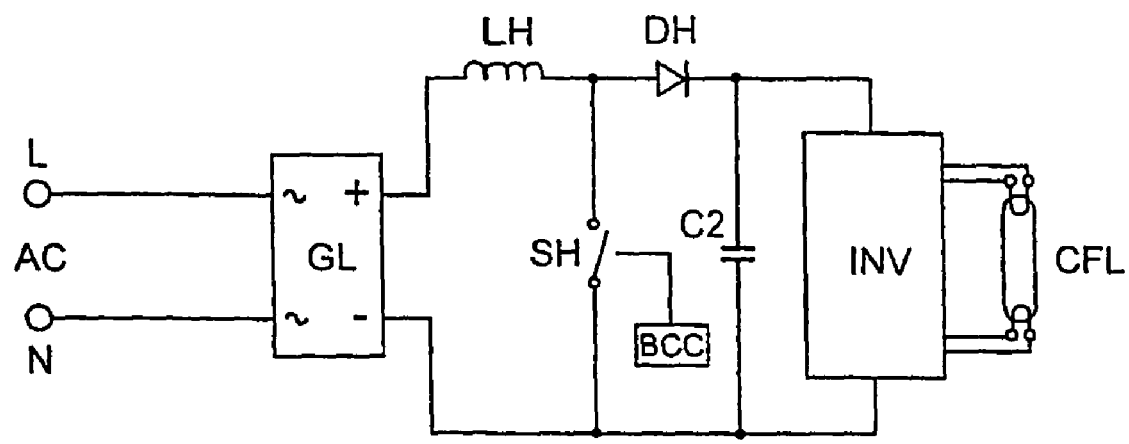
FIG. 1 shows, schematically, a step-up converter as part of an electronic ballast.

FIG. 1 shows, schematically, a step-up converter as part of an electronic ballast of a compact fluorescent lamp CFL.

The step-up converter is formed by an intermediate circuit capacitor C2, a diode DH, a storage inductor LH and a switching element SH, in this case a MOSFET, and a control circuit BCC, which is only indicated here, however, for driving the switching element SH.

The electronic ballast contains a rectifier GL, via which the intermediate circuit capacitor C2 is charged via the storage inductor LH and the diode DH. The intermediate circuit capacitor C2 supplies a compact fluorescent lamp CFL via an inverter circuit INV. The inverter INV operates the discharge lamp CFL with a high-frequency current. The step-up converter makes available the operating voltage for the inverter INV at its intermediate circuit capacitor C2. The invention in this example relates to the operation of the step-up converter.

The circuit functions as follows: The AC system voltage AC is converted in a rectifier GL into a pulsating DC voltage. The storage inductor LH and the diode DH are connected into the positive feedline. The switching element SH, in the switched-on state, ensures a current flow which rises up to a value which can be set (switch-off current threshold) in the storage inductor LH. Once the switching element SH has switched off, the diode DH conducts the current impressed in the storage inductor LH into the intermediate circuit capacitor C2.

Figure 2:
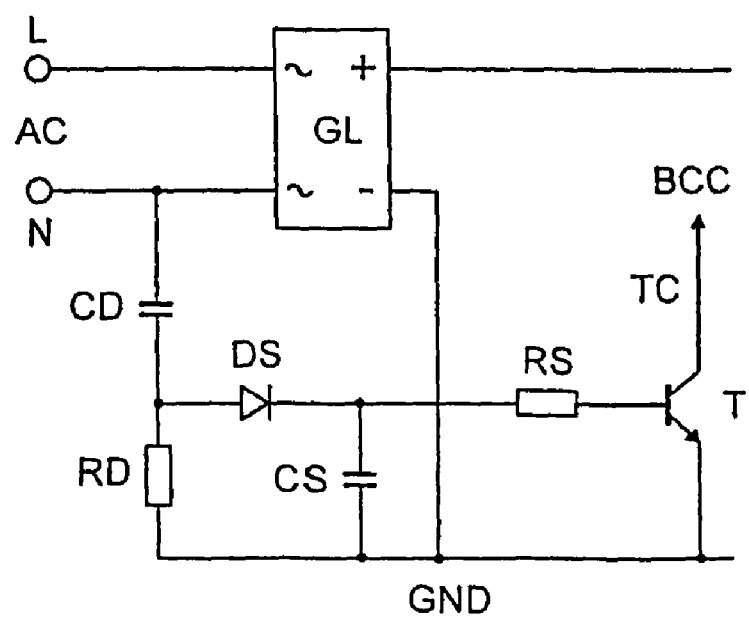
FIG. 2 shows a circuit arrangement for detecting phase gating.

FIG. 2 shows a circuit arrangement according to the invention for detecting whether the electronic ballast is being operated directly on the supply system or using a phase gating dimmer. A capacitor CD, as a differentiating element, is connected to one of the system feedlines N or L. A resistor RD, which connects the capacitor CD to the reference potential GND, is connected in series with this capacitor CD. The anode of a diode DS is connected to the node between the capacitor CD and the resistor RD; the cathode of said diode is connected in series with a further capacitor CS, likewise to the reference potential GND. This circuit represents a peak value detection circuit of the voltage occurring across the resistor RD. The base of a transistor T is connected to the node between the capacitor CS and the diode DS via a resistor RS. Its emitter is connected to the reference potential GND and its collector TC is connected to an input of the control circuit BCC of the step-up converter.

If the electronic ballast is connected directly to the system supply, no substantial jumps in the supply voltage occur. The component parts of the circuit arrangement in FIG. 2 are designed such that the peak value of the voltage across the resistor RD via the diode DS is stored in the capacitor CS, and the voltage across the capacitor CS cannot switch the transistor T on when the system supply is undimmed.

If the electronic ballast is connected to the supply system via a phase gating dimmer, however, the supply voltage demonstrates significant jumps. In this case, relatively high peak values occur across the resistor RD, so that the capacitor CS is charged to markedly higher values in comparison with operation without a phase gating dimmer. The voltage across the capacitor CS can now change the transistor T over to a conductive state via the resistor RS, whereby the collector-side output of the transistor TC is connected approximately to the reference potential GND.

The control circuit BCC of the step-up converter can be addressed via the output TC of the transistor T, so that its switch-off current threshold is reduced. For this purpose, a resistor can be connected in parallel with a resistor whose voltage defines a desired value for the switch-off current of the step-up converter, via the switch T. If the transistor T is on, the resulting desired value is therefore less than when the transistor T is off. If the switch-off current threshold of the step-up converter is reduced, the amplitude of the current drawn is lower. Since the intermediate circuit capacitor C2 is nevertheless intended to be charged to the same desired voltage, however, the step-up converter in this case draws current from the system for a longer period of time with a lowered switch-off current threshold. The power factor is therefore greater than without any reduction in the switch-off current threshold, and the step-up converter can now operate so as to conform to standards.

The invention described here can be used in a step-up converter as described in EP 1 465 330 A2. The step-up converter known from EP 1 465 330 A2 is designed such that it is switched off during direct operation on the supply system so as to avoid system current harmonics by means of a control circuit BCC. This step-up converter therefore has a circuit apparatus for detecting phase gating. The apparatus proposed here for detection of phase gating can advantageously be used for detecting phase gating and switching the step-up converter off via the control circuit BCC, as is also proposed in EP 1 465 330 A2.

In this case, the apparatus described here for detecting phase gating is less complex than the solution from EP 1 465 330 A2 and improves the signal-to-noise ratio.

In general, phase gating dimmers cause at least minimum phase gating in the supply. The detection of a phase gating dimmer in accordance with EP 1 465 330 A2 is based on a signal which is proportional to phase gating. Therein, a unique threshold value is set for the minimum possible phase gating. In view of the multiplicity of phase gating dimmers on the market, this is difficult. The signal-to-noise ratio in the case of low phase gating is poor; the signal which is proportional to the phase gating may be very small. The invention allows for substantially more discrete detection of phase gating since, even in the case of very low phase gating, the differentiator also produces relatively high peak voltages. Furthermore, the circuit from EP 1 465 330 A2 requires at least one comparator.

The invention claimed is:

1. An electronic ballast with a converter in the form of a step-up converter for selectively operating a discharge lamp directly on a system supply or using a phase gating dimmer,
    said electronic ballast comprising at least one differentiator, which is connected between a system line and a reference potential of the electronic ballast, so that jumps in the supply voltage are output by said at least one differentiator and are passed on to a controller of the electronic ballast,
    the controller being constructed in such a way that the controller distinguishes between operating said discharge lamp using said phase gating dimmer and operating the discharge lamp directly on said system supply,
    wherein said controller is configured to control said step-up converter so that during operation of the discharge lamp directly on said system supply, and in response to a detection of operation on said system supply by said controller, said step-up converter has a lower switch-off current threshold value than during operation of the discharge lamp using said phase gating dimmer, and wherein said step-up converter, during said direct operation on the system supply, draws a current from said system supply which has a lower amplitude than during operation using said phase gating dimmer.

2. The electronic ballast as claimed in claim 1, in which, during said direct operation on the system supply, the amplitude of the current drawn by the step-up converter from the system supply is set in such a way that current is drawn by the step-up converter at least over half the duration of a system half-cycle.

3. The electronic ballast as claimed in claim 1, in which, during said direct operation on the system supply, the amplitude of the current drawn by the step-up converter from the system supply is proportional to the supply voltage.

4. The electronic ballast as claimed in claim 1, in which the differentiator has a series circuit comprising a capacitor and at least one resistor.

5. The electronic ballast as claimed in claim 4 with a peak value detection circuit, which is connected in parallel with said resistor of the differentiator.

6. A discharge lamp with an integrated electronic ballast with a converter in the form of a step-up converter for selectively operating the discharge lamp directly on a system supply or using a phase gating dimmer, said electronic ballast comprising at least one differentiator, which is connected between a system line and a reference potential of the electronic ballast, so that jumps in the supply voltage are output by said at least one differentiator and are passed on to a controller of the electronic ballast,
    the controller being constructed in such a way that the controller distinguishes between operating said discharge lamp using said phase gating dimmer and operating the discharge lamp directly on said system supply,
    wherein said controller is configured to control said step-up converter so that during operation of the discharge lamp directly on said system supply, and in response to a detection of operation on said system supply by said controller, said step-up converter has a lower switch-off current threshold value than during operation of the discharge lamp using said phase gating dimmer, and wherein said step-up converter, during said direct operation on the system supply, draws a current from said system supply which has a lower amplitude than during operation using said phase gating dimmer.

7. A method for selectively operating an electronic ballast of a discharge lamp, the ballast comprising a step-up converter, the method allowing the discharge lamp to either operate directly on a system supply or operate using a phase gating dimmer, the ballast comprising a differentiator, which is connected between a system line and a reference potential of the electronic ballast, and a controller arranged to control the step-up converter,
    the method comprising the steps of:
    outputting jumps in a supply voltage and passing them onto the controller of the electronic ballast so that the controller distinguishes between operation using said phase gating dimmer and said direct operation on the system supply,
    and controlling the step-up converter by the controller so that during direct operation on the system supply the step-up converter has a lower switch-off current threshold value than during operation using said phase gating dimmer, so that the step-up converter during said direct operation on the system supply draws a current from the system supply which has a lower amplitude than during operation using said phase gating dimmer.

* * * * *